US010328600B2

(12) United States Patent
Kachi et al.

(10) Patent No.: US 10,328,600 B2
(45) Date of Patent: Jun. 25, 2019

(54) ELECTRIC CHAINSAW

(71) Applicant: MAKITA CORPORATION, Anjo, Aichi (JP)

(72) Inventors: Hideki Kachi, Aichi (JP); Yasuyuki Kawabata, Aichi (JP); Koji Haneda, Aichi (JP)

(73) Assignee: MAKITA CORPORATION, Anjo, Aichi (JP)

( * ) Notice: Subject to any disclaimer, the term of this patent is extended or adjusted under 35 U.S.C. 154(b) by 15 days.

(21) Appl. No.: 15/513,656

(22) PCT Filed: Oct. 1, 2015

(86) PCT No.: PCT/JP2015/077923
§ 371 (c)(1),
(2) Date: Mar. 23, 2017

(87) PCT Pub. No.: WO2016/056456
PCT Pub. Date: Apr. 14, 2016

(65) Prior Publication Data
US 2017/0297216 A1 Oct. 19, 2017

(30) Foreign Application Priority Data

Oct. 8, 2014 (JP) .................................. 2014-207478

(51) Int. Cl.
*B27B 17/00* (2006.01)
*B23D 57/02* (2006.01)
(Continued)

(52) U.S. Cl.
CPC ............ *B27B 17/08* (2013.01); *B23D 59/001* (2013.01); *B25F 5/02* (2013.01); *B27B 17/00* (2013.01); *B27B 17/0008* (2013.01); *B27B 17/02* (2013.01)

(58) Field of Classification Search
CPC ..... B27B 17/08; B27B 17/0008; B27B 17/02; B27B 17/00; B25F 5/02; B23D 59/001
(Continued)

(56) References Cited

U.S. PATENT DOCUMENTS 6,508,313 B1 * 1/2003 Carney ............... B25B 23/1405
173/1
6,950,030 B2 * 9/2005 Kovarik ............. G01R 31/3637
324/425

(Continued)

FOREIGN PATENT DOCUMENTS

EP 2 674 261 A1 12/2013
JP 2009-072892 A 4/2009
(Continued)

OTHER PUBLICATIONS

International Search Report for PCT/JP2015/077923, dated Nov. 24, 2015.

Primary Examiner — Ghassem Alie
Assistant Examiner — Bharat C Patel
(74) Attorney, Agent, or Firm — Sughrue Mion, PLLC

(57) ABSTRACT

An electric chainsaw includes a first handle having a grip portion that is provided with a trigger switch for activating an electric motor. The electric chainsaw includes a second handle having a laterally extending grip portion provided forward of the grip portion of the first handle. The electric chainsaw includes an indicator lamp for indicating a remaining charge amount of a battery pack, and a push-button type indicator switch for causing the indicator lamp to indicate the remaining charge amount. The indicator switch is provided at a position where the worker can operate the indicator switch by a finger of the other hand gripping the grip portion of the second handle.

7 Claims, 5 Drawing Sheets

(51) Int. Cl.
*B27B 17/08* (2006.01)
*B27B 17/02* (2006.01)
*B25F 5/02* (2006.01)
*B23D 59/00* (2006.01)

(58) Field of Classification Search
USPC .......................................................... 30/381
See application file for complete search history.

(56) References Cited

U.S. PATENT DOCUMENTS

| | | | |
|---|---|---|---|
| 8,813,374 B2 | 8/2014 | Lank et al. | |
| 9,154,062 B2 * | 10/2015 | Yanagihara | B25F 5/00 |
| 9,713,880 B2 * | 7/2017 | Haneda | B27B 17/00 |
| 2006/0091858 A1 * | 5/2006 | Johnson | B25F 5/00 |
| | | | 320/128 |
| 2006/0267547 A1 * | 11/2006 | Godovich | H01M 10/0413 |
| | | | 320/107 |
| 2013/0164567 A1 * | 6/2013 | Olsson | H01M 10/488 |
| | | | 429/7 |
| 2014/0047722 A1 * | 2/2014 | Onose | B27B 17/00 |
| | | | 30/383 |
| 2014/0190713 A1 * | 7/2014 | Martinsson | B25F 5/02 |
| | | | 173/20 |

FOREIGN PATENT DOCUMENTS

| | | | | |
|---|---|---|---|---|
| JP | 2010-208329 A | 9/2010 | | |
| JP | WO 2011027628 A1 * | 3/2011 | ........... | A01D 34/902 |
| JP | 2014-037077 A | 2/2014 | | |
| WO | 2012/108415 A1 | 8/2012 | | |
| WO | 2014/119174 A1 | 8/2014 | | |

\* cited by examiner

ELECTRIC CHAINSAW

CROSS REFERENCE TO RELATED APPLICATIONS

This is a National Stage of International Application No. PCT/JP2015/077923 filed Oct. 1, 2015, claiming priority based on Japanese Patent Application No. 2014-207478 filed Oct. 8, 2014, the contents of all of which are incorporated herein by reference in their entirety.

TECHNICAL FIELD

The present invention relates to an electric chainsaw in which a saw chain is endlessly moved along an outer periphery of a guide bar by an electric motor driven by electric power fed from a battery pack, and more specifically to an electric chainsaw configured to indicate a remaining charge amount of a battery pack.

BACKGROUND ART

JP 2010-208329A discloses an electric chainsaw in which a saw chain is endlessly moved along a periphery of a guide bar by driving of an electric motor. In such an electric chainsaw, a battery pack is detachably attached to a rear portion of a housing which houses an electric motor, wherein the electric motor is configured to be driven by electric power fed from the battery pack. The electric chainsaw comprises: a rear handle having a forwardly and rearwardly extending grip portion provided on the rear portion of the housing at a position rearward of the battery pack and configured to be gripped by one hand of a user or worker; and a front handle having a laterally extending grip portion provided on a front portion of the housing at a position forward of the battery pack and configured to be gripped by the other hand of the worker. The grip portion of the rear handle is provided with a trigger switch for triggering driving of the electric motor. The trigger switch is configured to be squeezed to cause electric power to be fed from the battery pack so as to drive the electric motor.

When this electric chainsaw is used in work of cutting lumber or the like, a worker grips the grip portion of the rear handle by his/her one hand, while gripping the grip portion of the front handle by the other hand. Then, the worker squeezes the trigger switch by the forefinger of the one hand being gripping the grip portion of the rear handle, to thereby activate the electric motor to cause the saw chain to be endlessly moved along an outer periphery of the guide bar. Then, the worker presses the saw chain being endlessly moved around the outer periphery of the guide bar, against lumber such as a log, to cut the lumber.

LIST OF PRIOR ART DOCUMENTS

Patent Documents

Patent Document 1: JP 2010-208329A

SUMMARY OF THE INVENTION

Technical Problem

The electric chainsaw disclosed in JP 2010-54316A comprises an indicator lamp provided on an upper surface of the battery pack and configured to indicate a remaining charge amount of the battery pack, and a push-button switch configured to be manually pushed down so as to turn on the indicator lamp. The battery pack is attached to the housing at a position between the rear handle and the front handle, so that the push-button switch for indication of the remaining charge amount of the battery pack is disposed at a position which is unreachable by any finger of the hand of the worker being gripping the grip portion of the rear or front handle. Thus, in the state in which the worker grips the grip portions of the rear and front handles, respectively, by his/her right and left hands, he/she cannot operate the push-button switch of the battery pack, i.e., the worker can manually push down the push-button switch so as to check the remaining charge amount of the battery pack, only after temporarily placing the electric chainsaw on the ground or a table. For this reason, operability of the above chain saw is not good.

In order to cope with this problem, it has been studied to provide the push-button switch for indication of the remaining charge amount of the battery pack, for example, in the vicinity of the rear handle on the housing. However, the grip portion of the rear handle is provided with the trigger switch for triggering or activating the electric motor, so that there is a risk that when a worker operates the push-button switch provided on the grip portion of the rear handle, by a finger of the hand being gripping the same grip portion, he/she can erroneously operate the trigger switch. Therefore, it is not appropriate to provide the push-button switch for indication of the remaining charge amount, in the vicinity of the rear handle.

Solution to the Technical Problem

It is an object of the present invention to provide an electric chainsaw configured to indicate a remaining charge amount of a battery pack, wherein the electric chainsaw is capable of enabling a user or worker who grips grip portions of rear and front handles of the electric chainsaw, respectively, by his/her right and left hands, to indicate and check the remaining charge amount of the battery pack, without any erroneous operation.

In order to achieve the above object, the present invention provides an electric chainsaw which comprises: an electric motor housed in a housing; a rechargeable battery pack detachably attached to the housing and usable as a power source of the electric motor; a guide bar having a base end fixed to a front portion of the housing and protruding forwardly; a saw chain provided around an outer periphery of the guide bar in a tensioned state and in an endlessly movable manner, and configured to be endlessly moved around the outer periphery of the guide bar by driving of the electric motor; a first handle having a forwardly and rearwardly extending grip portion provided on a rear portion or an upper portion of the housing and configured to be gripped by one hand of a worker, wherein the grip portion is provided with a trigger switch for activating the electric motor; a second handle having a laterally extending grip portion located forward of the grip portion of the first handle and configured to be gripped by the other hand of the worker; an indicator lamp for indicating a remaining charge amount of the battery pack, wherein the indicator lamp is provided at an easily viewable position on the housing; and an indicator switch for turning on the indicator lamp, wherein the indicator switch is provided at a position where the worker can operate the indicator switch by a finger of the other hand being gripping the grip portion of the second handle.

In the electric chainsaw of the present invention having the above feature, in a state in which a worker grips the grip portion of the first handle by the one hand, while gripping the grip portion of the second handle by the other hand, and then upholds the electric chainsaw, the worker can operate the indicator switch for indication of the remaining charge amount, by a finger of the other hand being gripping the grip portion of the second handle, so that it is possible to improve operability for indicating the remaining charge amount of the battery pack, without erroneously operating the trigger switch for the electric motor. This makes it possible to check the remaining charge amount of the battery pack, without placing the electric chainsaw on the ground or a table from the state in which the electric chainsaw is upheld while the grip portions of the first and second handles are gripped, respectively, by the right and left hands, thereby shortening an interruption time of work of cutting lumber or the like by the electric chainsaw.

Preferably, in the electric chainsaw of the present invention, the indicator switch for indication of the remaining charge amount is provided at a position where the worker can operate the indicator switch by a thumb or a forefinger of the other hand being gripping the grip portion of the second handle. Specifically, the indicator switch is preferably provided within 10 cm from the grip portion of the second handle. Depending on a configuration of the second handle, the indicator switch may be provided on the grip portion of the second handle.

In the electric chainsaw of the present invention, when the indicator switch is provided on an upper surface of the battery pack, the battery pack is preferably disposed at a position close to the grip portion of the second handle so as to enable the indicator switch to be operated by a finger of the hand being gripping the grip portion of the second handle.

In the electric chainsaw of the present invention, when the indicator lamp and the indicator switch are arranged at positions close to each other, it is possible to check the remaining charge amount of the battery pack by the indicator lamp without moving a line of sight at a time when the worker manually push down the indicator switch. Alternatively, in the electric chainsaw of the present invention, when the indicator lamp and the indicator switch are arranged at positions spaced apart from each other, it is possible to dispose the indicator switch at a position providing good operability.

DESCRIPTION OF EMBODIMENTS

Figure 1:
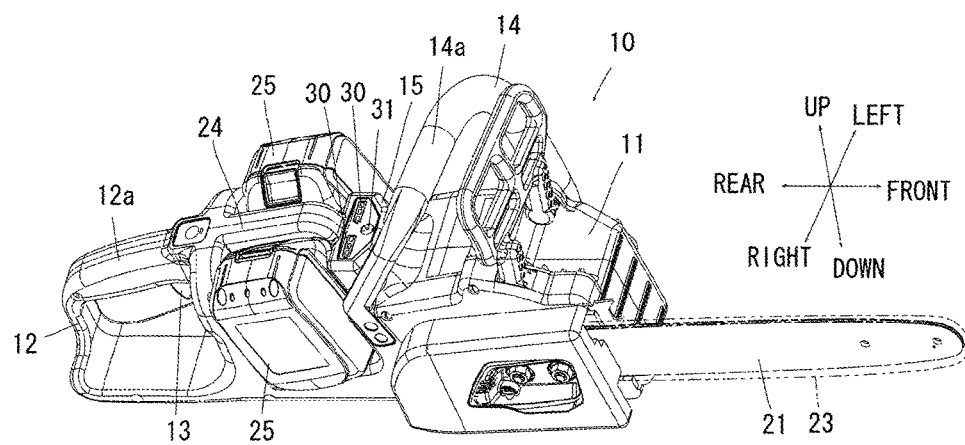
FIG. 1 is a perspective view of an electric chainsaw according to one embodiment of the present invention.
Figure 2:
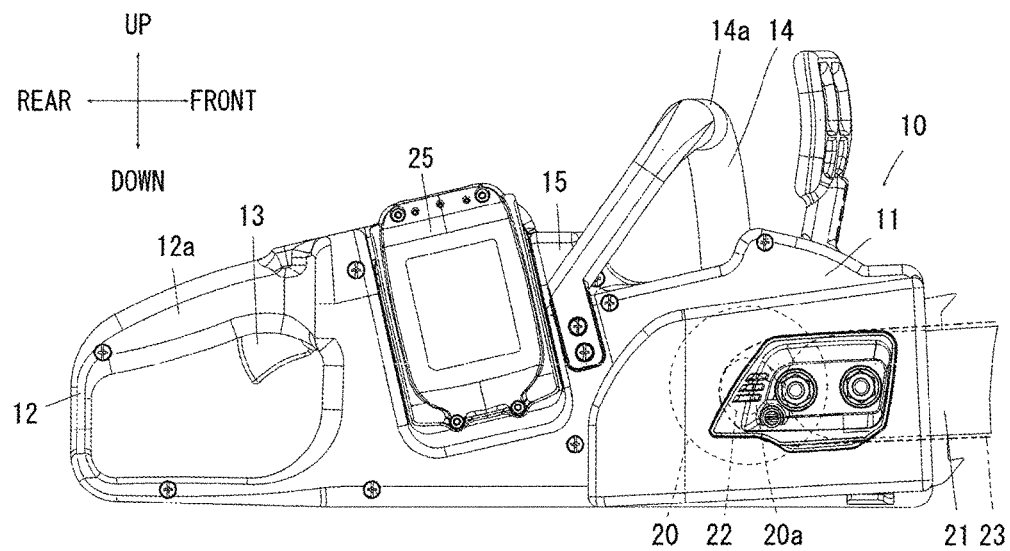
FIG. 2 is a right side view of the electric chainsaw in FIG. 1.

With reference to the accompanying drawings, an electric chainsaw according to one embodiment of the present invention will now be described. As depicted in FIGS. 1 and 2, in the electric chainsaw 10, an electric motor 20 is housed in a front portion of a housing 11, and a pair of right and left rechargeable battery packs 25 for use as a power source of the electric motor 20 is detachably provided on a rear portion of the housing 11. A guide bar 21 is provided to protrude forwardly with a base end thereof fixed to a front region of a right sidewall of the housing 11. A drive shaft 20a of the electric motor 20 protrudes outwardly from the front region of the right sidewall of the housing 11 at a position rearward of the guide bar 21, and a sprocket 22 is fixed to the drive shaft 20a. A saw chain 23 is wound around between an outer periphery of the guide bar 21 and the sprocket 22, in a tensioned state, so that the saw chain 23 can be endlessly moved around the outer periphery of the guide bar 21 by the sprocket 22 being rotated by driving of the electric motor 20. The drive shaft 20a of the electric motor 20, the base end of the guide bar 21 and the sprocket 22 are covered by a sprocket cover provided over the front region of the right sidewall of the housing 11. The rear portion of the housing 11 has a mounting section 24 for the battery packs 25, and the right and left battery packs 25 are detachably attached, respectively, to right and left sides of the mounting section 24.

Figure 3:
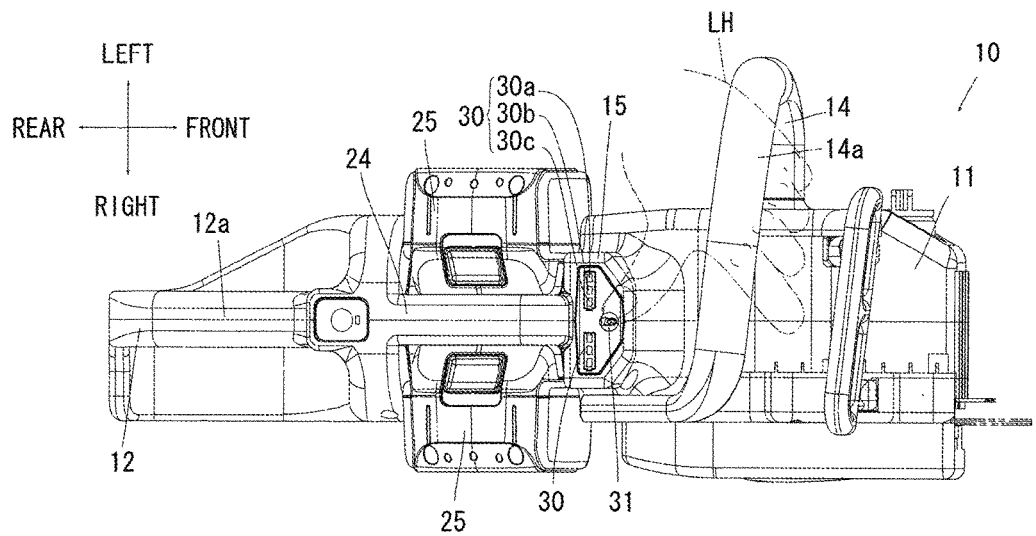
FIG. 3 is a plan view of the electric chainsaw in FIG. 1.

As depicted in FIGS. 1 to 3, a rear handle (first handle) 12 is integrally provided on the rear portion of the housing 11 at a position rearward of the battery packs 25. The rear handle 12 has a C shape whose rear side is closed, and an upper portion of the rear handle 12 is formed as a forwardly and rearwardly extending grip portion (first grip portion) 12a configured to be gripped by one hand of a user or worker. The grip portion 12a of the rear handle 12 is provided with a trigger switch 13 for activating the electric motor 20, on the side of a lower surface of the grip portion 12a. The trigger switch 13 is configured to be squeezed to cause electric power to be fed from the battery packs 25 so as to drive the electric motor 20.

As depicted in FIGS. 1 to 3, a front handle (second handle) 14 is provided on the front portion of the housing 11 at a position forward of the battery packs 25. The front handle 14 is attached to the front portion of the housing 11 in such a manner as to bridge between right and left sidewalls of the housing 11, and an upper portion of the front handle 14 is formed as a laterally extending front grip portion (second grip portion) 14a configured to be gripped by the other hand of the worker.

As depicted in FIGS. 1 to 3, an upwardly protruding indicator mount 15 is formed on an intermediate portion of the housing 11 in the forward-rearward direction, at a position forward of the mounting section 24 for the battery packs 25, and the indicator mount 15 has an upper surface on which a pair of right and left indicator lamps 30 for indicating a remaining charge amount of the battery packs 25, and a push button type indicator switch 31 for turning on the indicator lamps 30, are provided. As depicted in FIGS. 1 to 3 (particularly, FIG. 3), each of the indicator lamps 30 comprises three segment lamps 30a to 30c, wherein it is configured such that: when the remaining charge amount of a corresponding one of the battery packs 25 is equal to or greater than ⅔, all of the segment lamps 30a to 30c are turned on; when the remaining charge amount of the corresponding battery pack 25 is ⅓ to ⅔, only the two segment lamps 30a, 30b are turned on; when the remaining charge amount of the corresponding battery pack 25 is less than ⅓, only the segment lamp 30a is turned on; and, when the remaining charge amount of the battery packs 25 becomes 0, all of the segment lamps 30a to 30c are turned off.

As depicted in FIG. 3, the push button type indicator switch 31 is provided at a position where the worker can operate the indicator switch 31 by a finger of the other hand being gripping the grip portion 14a of the front handle 14 (hereinafter referred to simply as "front grip portion"). Specifically, the indicator switch 31 is provided at a position where the worker can operate the indicator switch 31 by a thumb of the other hand (in FIG. 3, left hand) LH in a state in which the front grip portion 14a is gripped by at least third, fourth and fifth fingers of the other hand. In the case where a worker grips the rear handle 12 by his/her one hand while gripping the front handle 14 by the other hand LH, and then supports a load of the electric chainsaw 10, it is preferable that the front grip portion 14a is gripped by at least third, fourth and the fifth fingers of the other hand LH. As above, in the state in which the front grip portion 14a is gripped by the other hand LH, a forefinger and a thumb of the other hand LH can be freely moved. Thus, in this embodiment, the indicator switch 31 is provided at a position where the worker can operate the indicator switch 31 by the thumb of the other hand LH.

When the electric chainsaw 10 constructed as above is used in work of cutting lumber or the like, a worker grips the grip portion 12a of the rear handle 12 and the front grip portion 14a, for example, by his/her right hand and left hand, respectively. Then, the worker squeezes the trigger switch 13 by the forefinger of the right hand being gripping the grip portion 12a of the rear handle 12, to thereby activate the electric motor 20 to cause the saw chain 23 to be endlessly moved along the outer periphery of the guide bar 21. Then, the worker presses the saw chain 23 being endlessly moved around the outer periphery of the guide bar 21, against lumber such as a log, to cut the lumber.

In the electric chainsaw 10 constructed as above, the pair of right and left indicator lamps 30 for indicating the remaining charge amount of the battery packs 25, and the indicator switch 31 for turning on the indicator lamps 30 are provided on the upper surface of the indication mount 15 formed on the intermediate portion of the housing 11 in the forward-rearward direction. More specifically, as depicted in FIG. 3, the indicator switch 31 is provided at a position where the worker can operate the indicator switch 31 by a finger of the other hand (in FIG. 3, left hand) LH being gripping the grip portion 14a of the front handle 14. In a state in which the worker grips the grip portion 12a of the rear handle 12 by the one hand while gripping the grip portion 14a of the front grip 14 by the other hand LH, and then upholds the electric chainsaw 10, the worker can operate the indicator switch 31 by a finger of the other hand LH being gripping the front grip portion 14a. This makes it possible to check the remaining charge amount of the battery packs 25 without placing the electric chainsaw 10 on the ground and/or on a table from the above state in which the electric chainsaw 10 is upheld while the grip portions 12a, 14a of the rear and front handles 12, 14 are gripped, respectively, by the right and left hands, thereby shortening an interruption time of the work of cutting lumber or the like by the electric chainsaw 10.

In addition, the indicator switch 31 is provided at a position where the worker can operate the indicator switch 31 by a finger of the other hand LH being gripping the grip portion 14a of the front handle 14, instead of a position where the worker can operate the indicator switch 31 by a finger of the one hand being gripping the grip portion 12a of the rear handle 12. Thus, the worker operates the trigger switch 13 while gripping the rear grip 12a by the one hand, and operates the indicator switch 31 while gripping the front grip portion 14a by the other hand LH. This makes it possible to enable the worker to manually push down the indicator switch 31 so as to check the remaining charge amount of the battery packs 25, without erroneously operating the trigger switch 13.

In this embodiment, the indicator switch 31 is provided rearward of the grip portion 14a of the front handle 14. Alternatively, in the case where the indicator mount 15 is provided forward of the grip portion 14a of the front handle 14, as depicted in FIG. 4, the indicator switch 31 may be disposed forward of the grip portion 14a of the front handle 14 at a position where the worker can operate the indicator switch 31 by the forefinger of the other hand LH being gripping the grip portion 14a.

Figure 4:
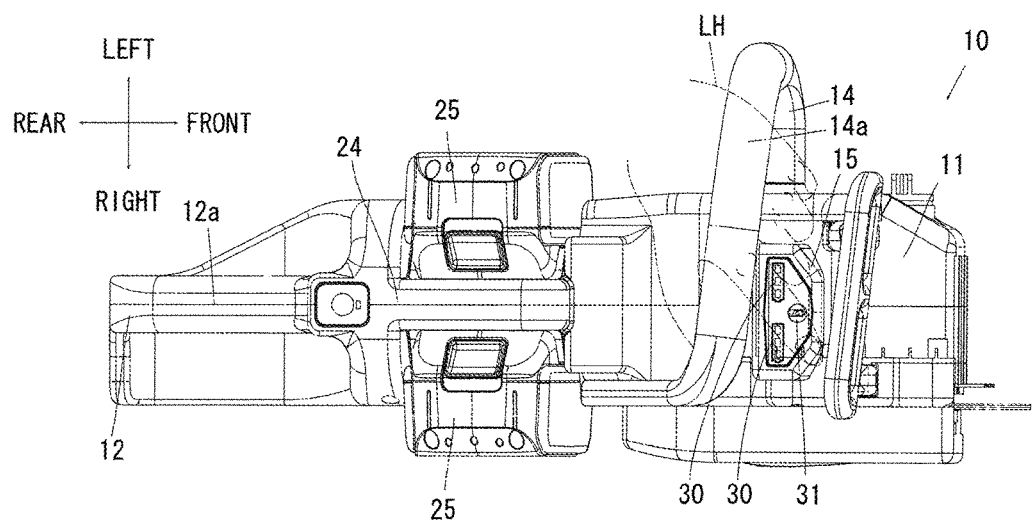
FIG. 4 is a top plan view of the electric chainsaw according to another embodiment of the present invention, wherein an indicator lamp and an indicator switch are provided forward of a front grip portion.
Figure 5:
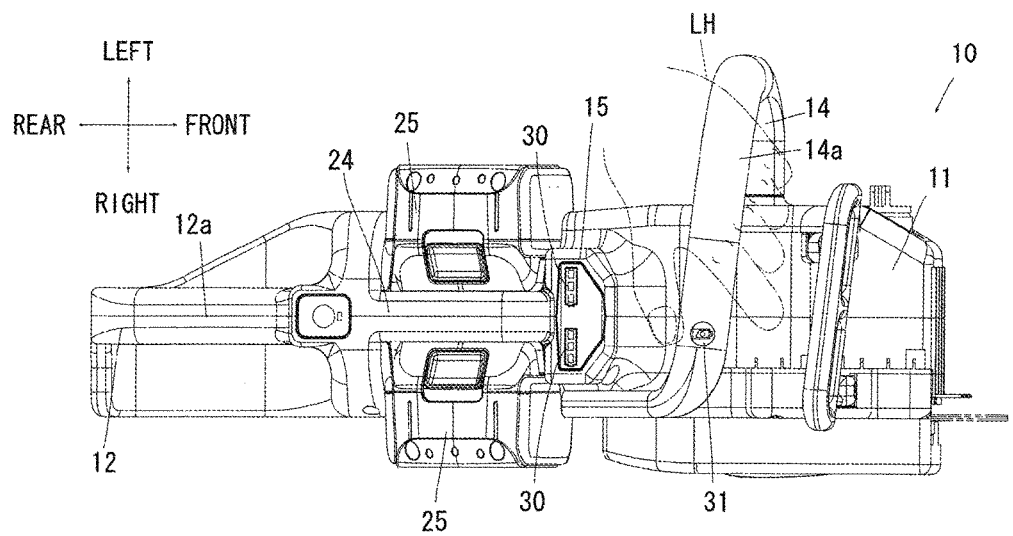
FIG. 5 is a plan view of an electric chainsaw according to yet another embodiment of the present invention, wherein an indicator switch is provided on a front grip portion.

Alternatively, as depicted in FIG. 5, the indicator switch 31 may be provided on the grip portion 14a of the front handle 14. In such case, the worker can operate the indicator switch 31 by the thumb of the other hand LH being gripping the front grip portion 14a. In each of the embodiments depicted in FIGS. 3 to 5, the indicator switch 31 is provided within 10 cm around the grip portion 14a so as to enable the worker to operate the indicator switch 31 by any finger of the other hand LH being gripping the gripping portion 14a of the front handle 14.

The indicator switch 31 may be disposed at a position close to the indicator lamps 30, as depicted in FIGS. 3 and 4. In this case, it is possible to check the remaining charge amount of the battery packs 25 by corresponding ones of the indicator lamps 30 without moving a line of sight at a time when the worker manually push down the indicator switch 31. Alternatively, the indicator switch 31 may be disposed at a position spaced apart from the indicator lamps 30, as depicted in FIG. 5. In this case, it is possible to dispose the indicator switch 31 at a position providing good operability.

Figure 6:
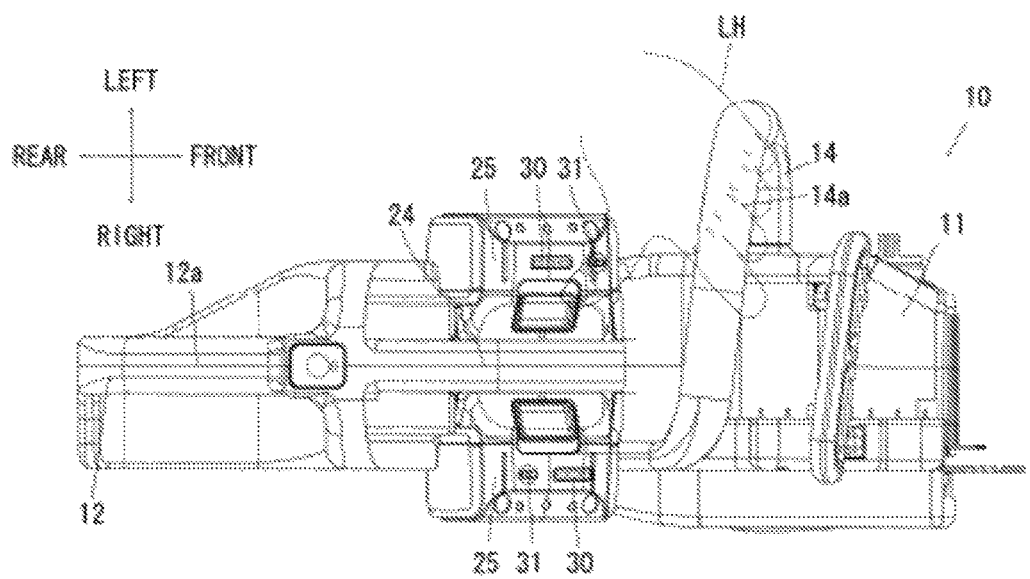
FIG. 6 is a plan view of an electric chainsaw according to still another embodiment of the present invention, wherein an indicator lamp and an indicator switch are provided on an upper surface of a battery pack.

Further, as depicted in FIG. 6, both of the indicator lamp 30 and the indicator switch 31 may be provided on an upper surface of each of the battery packs 25. In this case, each of the battery packs 25 may be disposed on the housing 11 at a position close to the grip portion 14a of the front handle 14 so as to enable the indicator switch 31 to be located at a position where the worker can operate the indicator switch 31 by a finger of the other hand LH being gripping the grip portion 14a of the front handle 14. For example, each of the battery packs 25 is disposed immediately rearward of the front grip portion 14a, and the upper surface of the battery pack is inclined to extend forwardly and obliquely downwardly so as to cause the indicator switch 31 to be oriented toward the grip portion 14a. This makes it possible to dispose the indicator switch 31 at a position where the worker can operate the indicator switch 31 by a finger of the other hand LH being gripping the front grip portion 14a.

Figure 7:
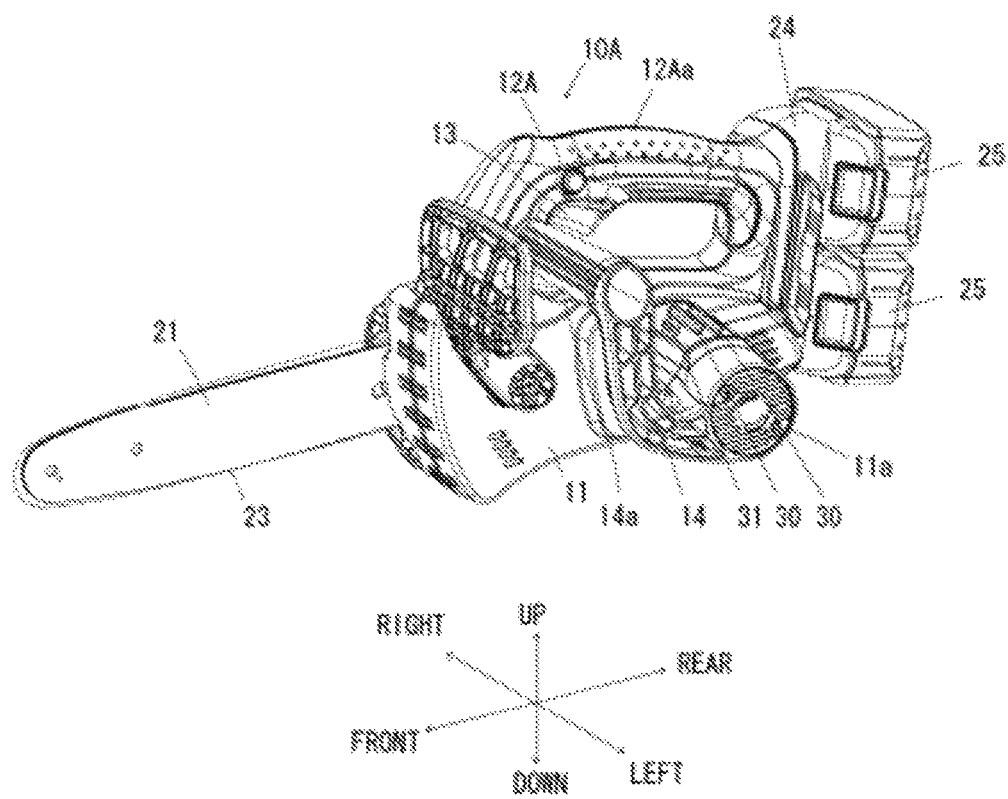
FIG. 7 is perspective view of a top handle type electric chainsaw.

Although the electric chainsaw according to each of the above embodiments is a rear handle type chainsaw in which the rear handle 12 is provided on the rear portion of the housing 11, the present invention can also be applied to a top handle type electric chainsaw in which a top handle (first handle) 12A is provided on an upper portion of the housing 11, as depicted in FIG. 7 as another embodiment.

The top handle type electric chainsaw 10A comprises: an electric motor 20 housed in a housing 11; two battery packs 25 detachably attached to a rear portion of the housing 11 and used as a power source of the electric motor 20; a guide bar 21 having a base end fixed to a front portion of the housing 11 and protruding forwardly; and a saw chain 23 provided around an outer periphery of the guide bar 21 in a tensioned state and in an endlessly movable manner, and configured to be endlessly moved around the outer periphery of the guide bar 21 by driving of the electric motor 20. This electric chainsaw 10A further comprises: a top handle (first handle) 12A having a forwardly and rearwardly extending top grip portion (first grip portion) 12Aa provided on an upper portion of the housing 11 and configured to be gripped by one hand of a worker, wherein the top grip portion is provided with a trigger switch 13 for activating the electric motor 20; and a front handle (second handle) 14 having a laterally extending grip portion 14a located forward of the grip portion 12Aa of the top handle 12A and configured to be gripped by the other hand of the worker.

Figure 8:
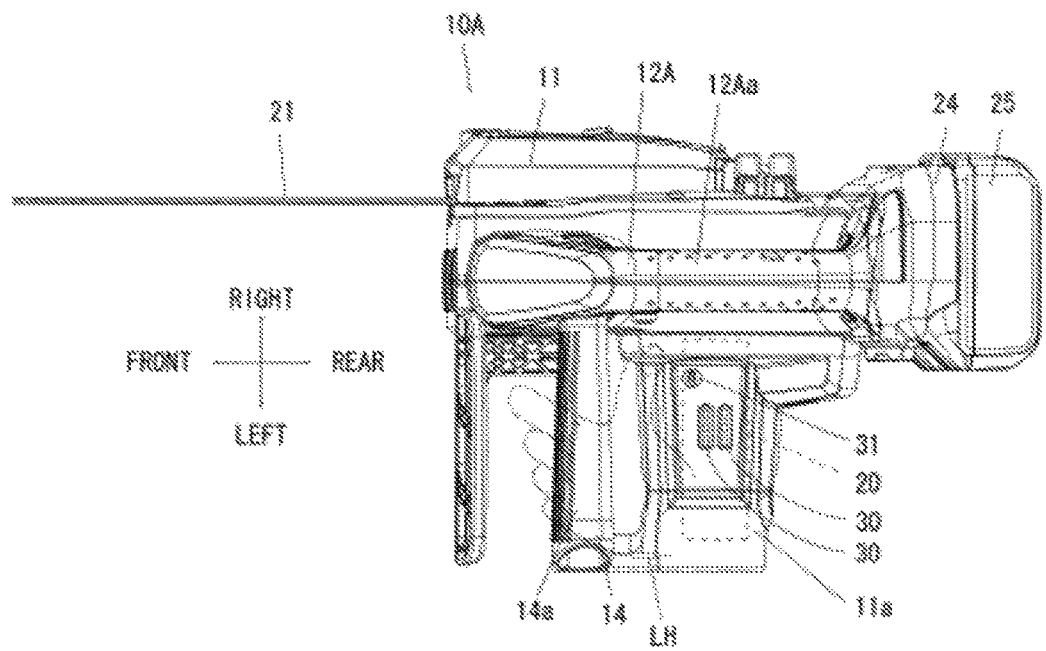
FIG. 8 is a top plan view of the electric chainsaw depicted in FIG. 7.

In the top handle type electric chainsaw 10A, the housing 11 has a motor receiving section 11a formed in an intermediate region thereof in a forward-rearward direction to protrude leftwardly from a left sidewall thereof, and the electric motor 20 is received in the motor receiving section 11a. As depicted in FIGS. 7 and 8, two indicator lamps 30 each for indicating a remaining charge amount of a corresponding one of the battery packs 25, and a push button type indicator switch 31, are provided on an upper surface of the motor receiving section 11a. The indicator switch 31 is provided at a position where the worker can operate the indicator switch 31 by a finger of the other hand LH being gripping the grip portion 14a of the front handle 14. As above, in the top handle type electric chainsaw 10A constructed as above, the indicator switch 31 is provided at a position where the worker can operate the indicator switch 31 by a finger (particularly, thumb) of the other hand LH being gripping the grip portion 14a of the front handle 14. Thus, in a state in which the worker grips the top grip portion 12Aa of the top handle 12A by the one hand while gripping the grip portion 14a of the front handle 14 by the other hand LH, and then upholds the electric chainsaw 10A, the worker can operate the indicator switch 31 by a finger of the other hand LH being gripping the grip portion 14a of the front handle 14. This makes it possible to check the remaining charge amount of the battery packs 25 without placing the electric chainsaw 10A on the ground and/or on a table from the above state in which the electric chainsaw 10A is upheld while the grip portions 12Aa, 14a of the top and front handles 12A, 14 are gripped, respectively, by the right and left hands, thereby shortening an interruption time of work of cutting lumber or the like by the electric chainsaw 10A.

As above, the indicator switch 31 is provided at a position where the worker can operate the indicator switch 31 by a finger of the other hand LH being gripping the grip portion 14a of the front handle 14, instead of a position where the worker can operate the indicator switch 31 by a finger of the one hand being gripping the grip portion 12Aa of the top handle 12A. In this case, the worker operates the trigger switch 31 while gripping the top grip portion 12Aa by the one hand, and operates the indicator button 31 while gripping the front grip portion 14a by the other hand LH. This makes it possible to enable the worker to manually push down the indicator switch 31 so as to check the remaining charge amount of the battery packs 25, without erroneously operating the trigger switch 13.

Figure 9:
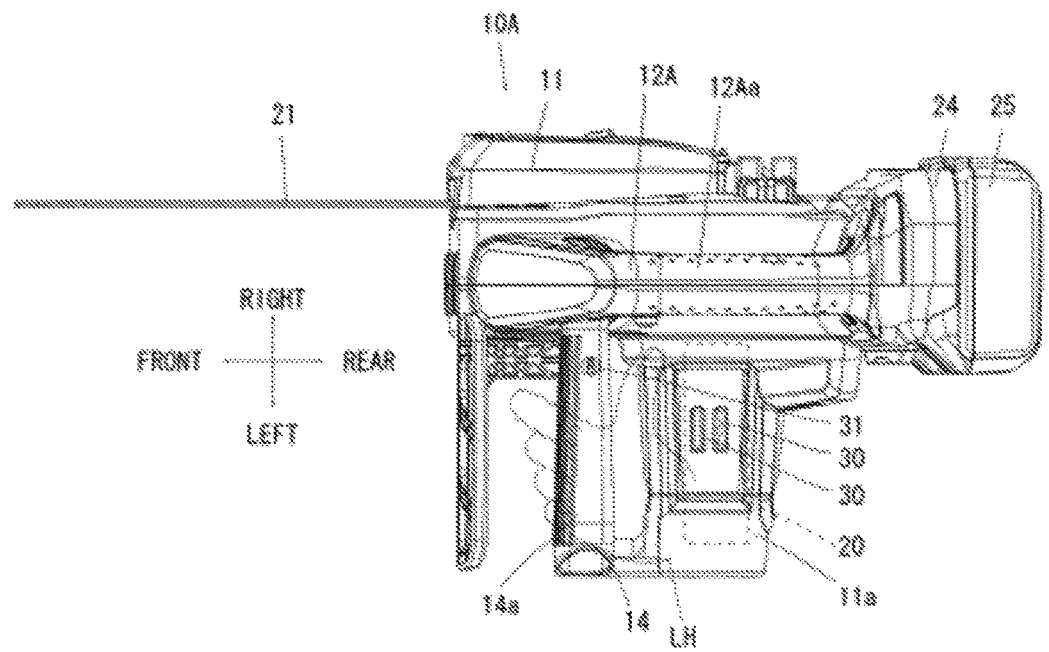
FIG. 9 is a top plan view of a top handle type electric chainsaw according to yet still another embodiment of the present invention, wherein an indicator switch is provided on a front grip portion.

Further, in the top handle type electric chainsaw 10A as depicted in FIG. 9, the indicator switch 31 may be provided on the grip portion 14a of the front handle 14 at a position where the worker can operate the indicator switch 31 by the thumb of the other hand LH being gripping the front grip portion 14a, as with the rear handle type electric chainsaw depicted in FIG. 5. Preferably, in the top handle type electric chainsaw 10A, the indicator switch 31 is provided within 10 cm from the grip portion 14a of the front handle 14, i.e., at a position which is reachable by a finger of the other hand LH. In the top handle type electric chainsaw 10A, the indicator switch 31 may be disposed at a position close to the indicator lamps 30, or may be disposed at a position spaced apart from the indicator lamps 30. Further, when both of the indicator lamp 30 and the indicator switch 31 are provided on an upper surface of each of the battery packs 25, each of the battery packs 25 may be disposed on the housing 11 at a position close to the front grip portion 14a so as to enable the indicator switch 31 to be located at a position where the worker can operate the indicator switch 31 by a finger of the other hand being gripping the front grip portion 14a of the front handle 14.

Although each of the above embodiments has been described based on an example where two battery packs 25 are used as a power source for driving the electric motor 20 of the electric chainsaw 10, 10A, the present invention is not limited thereto, but the number of the battery packs 25 may be one, or three or more.

Although each of the above embodiments has been described based on an example where the indicator lamp 30 comprise three segment lamps 30a to 30c, wherein the remaining charge amount of the battery pack 25 is indicated according to the number of turned-on ones of the segment lamps 30a to 30c, the present invention is not limited thereto. For example, the number of the segment lamps may be increased or may be reduced. Further, the remaining charge amount may be indicated by a rate (e.g., %). In the case where the number of the indicator lamps is set to one, the indicator lamp may be configured to be continuously turned on when electric power sufficient to drive the electric motor 20 remains and to be blinked when the remaining charge amount becomes insufficient to drive the electric motor 20.

EXPLANATION OF CODES

10: electric chainsaw
11: housing
12: first handle (rear handle)
12a: first grip portion (rear grip portion)
12A: first handle (top handle)
12Aa: first grip portion (top grip portion)
13: trigger switch
14: second handle (front handle)
14a: second grip portion (front grip portion)
20: electric motor
21: guide bar
23: saw chain
25: battery pack
30: indicator lamp
31: indicator switch

What is claimed is:
1. A chainsaw comprising:
   a housing;
   an electric motor housed in the housing;

a rechargeable battery pack detachably attached onto the housing and used as a power source of the electric motor;

a guide bar having a base end fixed to a front portion of the housing, the guide bar protruding forwardly from the housing;

a saw chain provided around an outer periphery of the guide bar in a tensioned state and in an endlessly movable manner, the electric motor driving the saw chain;

a first handle having a first grip portion provided on a rear portion or an upper portion of the housing, the first grip portion extending in a forward-rearward direction and being configured to be gripped by one hand of a worker, the first grip portion including a trigger switch for activating the electric motor;

a second handle having a second grip portion located forward of the first grip portion, the second grip portion extending in a lateral direction and being configured to be gripped by the other hand of the worker;

an indicator lamp for indicating a remaining charge amount of the battery pack, the indicator lamp being provided at a position on the housing at which the worker is able to view the indicator lamp while gripping the first grip portion and the second grip portion; and an indicator switch for turning on the indicator lamp, the indicator switch being provided at a position where the worker can operate the indicator switch using a finger of the other hand while the worker is gripping the second grip portion, wherein the housing has an upper surface and side surfaces, and each of the indicator lamp and the indicator switch is positioned on an upper surface of the housing, and wherein the indicator switch is disposed in a vertical direction with respect to the forward-rearward direction and that is orthogonal to the lateral direction and is configured to be depressed in the vertical direction to permit the worker to operate the indicator switch by depressing the indicator switch in the vertical direction.

2. The chainsaw as recited in claim 1, wherein the indicator switch is provided at a position where the worker can operate the indicator switch using a thumb or a forefinger of the other hand being gripping the second grip portion.

3. The chainsaw as recited in claim 1, wherein the indicator switch is provided within 10 cm from the second grip portion.

4. The chainsaw as recited in claim 1, wherein the indicator switch is provided on the second grip portion.

5. The chainsaw as recited in claim 1, wherein the indicator switch is provided on an upper surface of the battery pack, and wherein the battery pack is disposed on the housing at a position close to the second grip portion so as to enable the indicator switch to be operated by a finger of the other hand of a worker that is gripping the second grip portion.

6. The chainsaw as recited in claim 1, wherein the indicator lamp and the indicator switch are arranged at positions close to each other.

7. The chainsaw as recited in claim 1, wherein the indicator lamp and the indicator switch are arranged at positions spaced apart from each other.

* * * * *